E. J. FEENY.
UNIVERSAL JOINT.
APPLICATION FILED JULY 5, 1912.

1,096,293.

Patented May 12, 1914.

2 SHEETS—SHEET 1.

Witnesses
Frank A. Fahle
Josephine Gasper

Inventor
Edmund J. Feeny,
By Arthur M. Hood
Attorney

E. J. FEENY.
UNIVERSAL JOINT.
APPLICATION FILED JULY 5, 1912.

1,096,293.

Patented May 12, 1914.
2 SHEETS—SHEET 2.

Witnesses
Frank A. Fahle
Josephine Gasper

Inventor
Edmund J. Feeny,
by Arthur M. Hood
Attorney

UNITED STATES PATENT OFFICE.

EDMUND J. FEENY, OF MUNCIE, INDIANA, ASSIGNOR TO THE FEENY-HURD COMPANY, OF MUNCIE, INDIANA, A CORPORATION OF INDIANA.

UNIVERSAL JOINT.

1,096,293.  Specification of Letters Patent.  Patented May 12, 1914.

Application filed July 5, 1912. Serial No. 707,701.

*To all whom it may concern:*

Be it known that I, EDMUND J. FEENY, a citizen of the United States, residing at Muncie, in the county of Delaware and State of Indiana, have invented a new and useful Universal Joint, of which the following is a specification.

It is the object of this invention to provide a universal joint which has its working surfaces all on one side of a medial plane, is totally immersed in a lubricant, is easily assembled and disassembled, and withal is simple and inexpensive. To this end I have provided a joint having a ball member, a socket member, and an intermediate cup-shaped member which fits into the socket member and receives the ball member, the cup member being in the shape of a substantially hemispherical shell and engaging the adjacent socket and ball members by interfitting flanges and grooves in transverse planes.

The accompanying drawings illustrate my invention.

Figure 1:
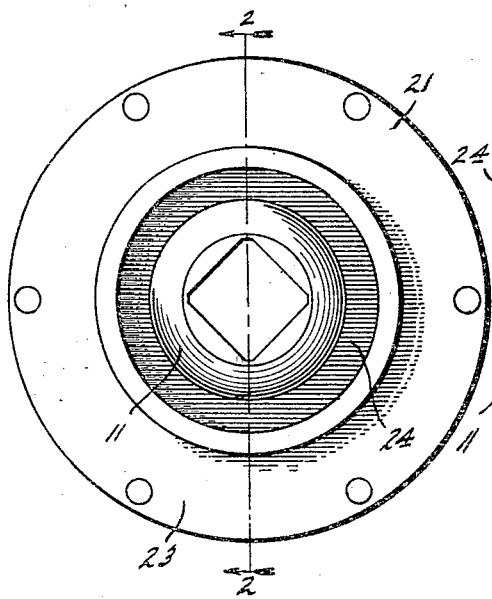
Figure 2:
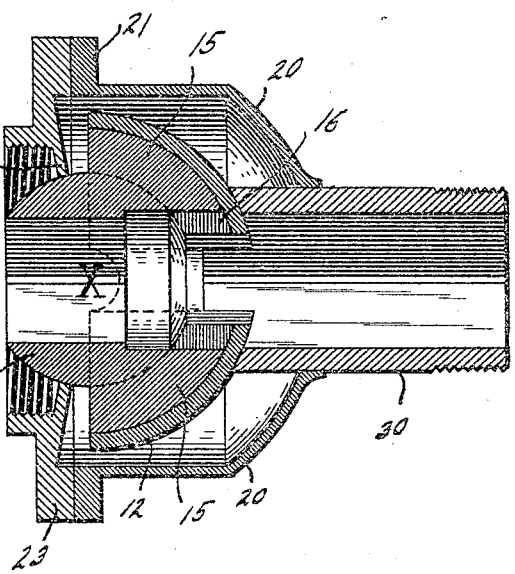
Figure 3:
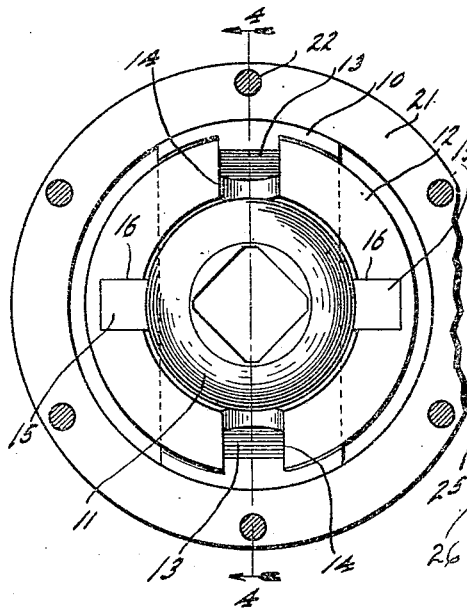
Figure 4:
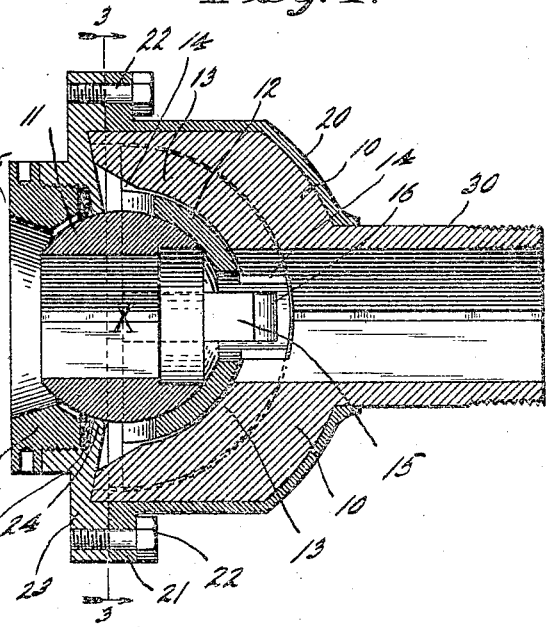
Figure 5:
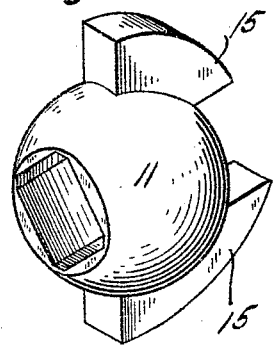
Figure 6:
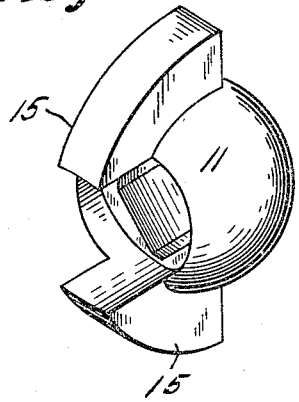
Figure 7:
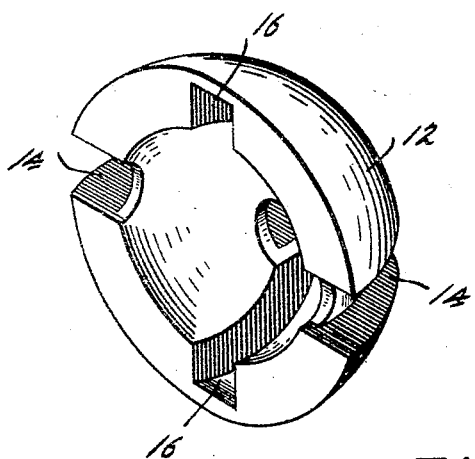
Figure 8:
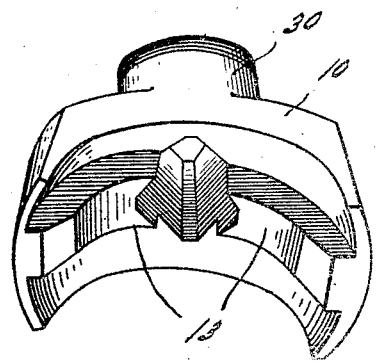
Figure 9:
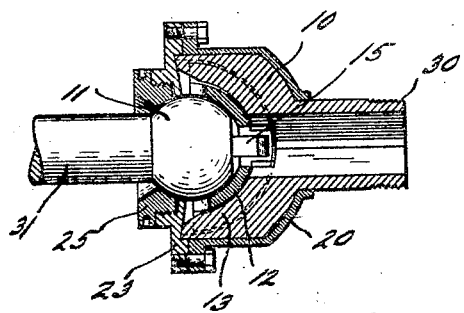

In these drawings, Figure 1 is an end view of a universal joint embodying my invention; Fig. 2 is a section on the line 2—2 of Fig. 1; Fig. 3 is a section on the line 3—3 of Fig. 4, the joint being rotated 90° from the position shown in Fig. 1; Fig. 4 is a section on the line 4—4 of Fig. 3; Figs. 5 and 6 are two perspective views of the ball member, taken from opposite points of view; Fig. 7 is a perspective view of the intermediate or cup member; Fig. 8 is a perspective view of the socket member; and Fig. 9 is a longitudinal sectional view showing the ball member integral with a shaft.

The universal joint comprises a socket or concave member 10, a ball or convex member 11, and an intermediate or cup member 12. The cup member 12 is approximately hemispherical within and without, and fits into a corresponding depression in the end of the socket member 10 and receives the substantially spherical ball member 11. The socket member 10 is provided with a pair of inwardly projecting flanges 13 which are in the same plane and engage a corresponding groove 14 in the outer surface of the cup member 12; and the ball member 11 is provided with a pair of flanges 15 which engage a corresponding groove 16 in the inner surface of the cup member 12. The grooves 14 and 16 are in transverse planes, and the surfaces of said grooves and their corresponding flanges are such that the only relative movements possible between the ball, socket, and cup are about a common center of action X of the joint. The adjacent spherical surfaces, and the flanges 13 and 15 and grooves 14 and 16, are normally each entirely on one side of the transverse plane determined by the aforesaid axes, so that the parts may be nested together or taken apart with ease.

The joint is located in a cup-like casing 20 which fits tightly around the socket member 10 and is provided with a circular flange 21, to which may be attached, by bolts 22, a clamping and retaining ring 23. This ring 23 bears against the end of the socket member 10 and clamps the casing 20 in place on the socket member 10, and is preferably provided with an inwardly projecting flange 24 which bears against the spherical surface of the ball member 11 on the opposite side of the aforesaid transverse plane from the coöperating surfaces of the joint proper. The flange 24 prevents the parts from coming apart when the retaining ring 23 is in place. The retaining ring 23 is threaded to receive a packing nut 25 which holds a packing 26 in place. The cup-like casing 20 is filled with a lubricant when the joint is in operation, so that the joint operates immersed in this lubricant.

The members 10 and 11 may be provided with any convenient means for attachment to the two shafts to be connected by the joint. The socket member 10 is shown as provided with a stem 30, which has a square axial hole and is threaded externally; and the ball member 11 may either be provided with a square axial hole, as shown in Figs. 1 to 6, or with a stem 31, as shown in Fig. 9.

I claim as my invention:

A universal joint comprising convex and concave members, an intermediate member between the concave and convex members, said intermediate member engaging the concave and convex members by interfitting grooves and flanges which are in transverse planes and lie wholly on one side of the plane passing through the center of the joint, a clamping member slidably bearing against the convex member on the opposite side of said last-named plane from that on which said grooves and flanges are located, and a casing member inclosing said concave member and attached to said clamping member to form an oil casing.

In witness whereof, I, have hereunto set my hand and seal at Indianapolis, Indiana, this 3rd day of July, A. D. one thousand nine hundred and twelve.

EDMUND J. FEENY. [L. S.]

Witnesses:
ARTHUR M. HOOD,
FRANK A. FAHLE.

Copies of this patent may be obtained for five cents each, by addressing the "Commissioner of Patents, Washington, D. C."